Oct. 29, 1963 J. A. HOERNI 3,108,914

TRANSISTOR MANUFACTURING PROCESS

Filed June 30, 1959

INVENTOR.
JEAN A. HOERNI

BY

Lippincott & Ralls

ATTORNEYS 3,108,914
Patented Oct. 29, 1963

3,108,914

TRANSISTOR MANUFACTURING PROCESS

Jean A. Hoerni, Los Altos, Calif., assignor, by mesne assignments, to Fairchild Camera and Instrument Corporation, Syosset, N.Y., a corporation of Delaware Filed June 30, 1959, Ser. No. 823,954
8 Claims. (Cl. 148—186)

The present invention relates in general to the provision of a manufacturing process for semiconducting devices and more particularly to a process for improving the electrical characteristics of diode semiconductors and transistors to the end of establishing therein more sharply varying current-voltage characteristics.

The process of this invention contemplates the addition of a few simple steps in the manufacture or fabrication of semiconducting devices such as diodes and transistors, and includes the controlled addition to the semiconducting material of a selected metal impurity. Although it is common practice in the transistor art to controllably add impurities to the basic material, such as germanium or silicon, these impurities are normally designed to fulfill more obvious functions. In particular, it is conventional to diffuse selected impurities into silicon, for example, in order to produce transistor junctions within the material and a great body of art has arisen covering the manners and means for accomplishing the controlled addition of such impurities. It is also known that certain impurities may be added in controlled quantities to increase the lifetime of transistor carriers. Research in this latter field has indicated that nickel is highly desirable as an additive to improve the carrier lifetime, while certain other metals such as gold are highly undesirable in this respect. While great effort has been expended in certain aspects of the problems involved in controlling semiconductor characteristics by the addition of impurities with marked advancements resulting therefrom, certain other aspects of the problem have not been so treated. Thus, while it is possible to postulate the possible and desirable current-voltage relationship of a diode semiconductor, for example, it has been found that actual diodes tend to materially deviate therefrom, at least in certain aspects.

As regards diode semiconductors, it has been found that reverse breakdown voltage-current relationships tend not to vary sharply, as is desired for switching applications of these devices. To the contrary, many diodes exhibit gradually varying reverse breakdown characteristics and such diodes have been denominated as "soft diodes." This departure of actually manufactured diode structures from the desired characteristics thereof is quite substantial and often serves to materially limit applicability of the devices. For example, the reverse current flow at a particular value of reverse voltage for a commercially available semiconducting diode has been measured at 20 milliamperes as contrasted to a desired and expected current amplitude of 0.001 microamperes. It will be seen that the actual diode falls short of the theoretically predicted diode characteristics by a very large factor. The process of the present invention is directed to the production of diode semiconductors having the desired predicted reverse current-voltage relationships.

In the manufacture of transistors of three and more elements it has been likewise found that the variation of current with the voltage often assumes a relatively "soft" characteristic, wherein a gradual current variation with increased voltage results rather than an abrupt change, as may be desired. Specifically, as regards transistors, the collector current is often found to increase in a gradual and relatively uniform relationship with increased collector voltage, rather than the sharp current increase desired at a particular value of collector voltage. The present invention is directed to the production of transistors having sharply varying electrical characteristics of the type more nearly following the predictable and desired current-voltage characteristics.

Although the above-noted characteristics of "soft diodes" and the similar characteristics of transistors have been recognized by many workers in the field, the difficulties of solid state analysis have to date effectively limited desired improvements therein. Theoretical approaches to solid state physics have proven quite difficult and, furthermore, complete and satisfactory analysis of solid state devices is also sufficiently difficult to seriously hamper full and complete understanding of the true causes of observed phenomenon. It has been postuated that certain undesirable electrical characteristics of semiconducting devices may be caused by the presence of particular impurities in the semiconducting material, or that such characteristics may be in part due to certain crystal lattice structures or imperfections. Various evidence is available to support different theories in this respect, however, it is well known that conventional manufacturing techniques produce many semiconducting devices which have certain of the electrical characteristics thereof wholly unsuited to particular applications of the device, while at the same time certain other semiconducting devices produced by the same or like process may have the desired electrical characteristics.

Although it is not herein intended to postulate a new theory of solid state physics which is basically adapted to provide theoretical solutions to presently existing problems, there is herein provided a manufacturing process which provides a highly desirable improvement in transistor characteristics. The process hereof actually relates to an addition to normal and conventional transistor manufacturing processes. Only very simple and inexpensive operations are required to carry out the process of this invention, and the same are readily adapted for inclusion in conventional transistor manufacturing methods. In accordance herewith there is controllably diffused into the semiconducting material of a device such as a transistor, a limited amount of a particular metal which serves to materially vary the electrical characteristics of the material so processed. In distinction to previous impurity diffusion processes, the materials herein suited for diffusion include the so-called "deep level impurities," such being defined in the literature. Gold and nickel are embraced by the foregoing definition. While it is true that nickel has been previously employed for diffusion into semiconducting materials for reasons wholly different from the present invention, it is widely accepted that the diffusion of gold into semiconducting material is highly deleterious, inasmuch as gold impurities tend to materially reduce the carrier lifetime. Various other of the deep level impurities are likewise generally considered to be unacceptable as impurities in even minute amounts in semiconducting material because of various deleterious effects attributable thereto.

It is an object of the present invention to provide an improved process of manufacturing semiconducting devices.

It is another object of the present invention to provide a process for improving the electrical characteristics of semiconducting devices.

It is a further object of the present invention to provide a process for improving the electrical characteristics of transistors to sharpen the current-voltage relationship.

It is yet another object of the present invention to provide an improvement process for establishing sharp characteristics of otherwise soft semiconductor diodes.

Various other objects and possible advantages of the present invention will become apparent to those skilled in the art from the following description of the invention, however, no limitation is intended by the terms of the following description, and reference is instead made to the appended claims for a precise delineation of the true scope of this inveniton.

The invention is illustrated in the accompanying drawings, wherein.

Figure 1:
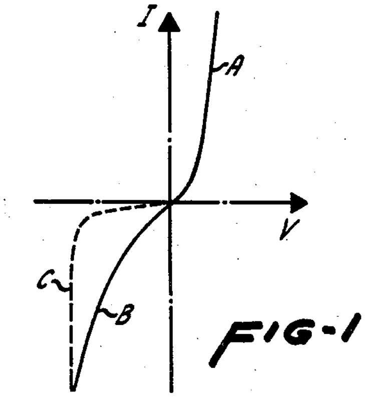
FIG. 1 is a graphical illustration of the current-voltage relationship across a semiconducting diode.

As regards the particular results to be obtained by the process of this invention, reference is made to FIG. 1 of the drawings wherein there is shown by the solid curve A, the current variation with forward biasing of a diode semiconductor. The curve B of this figure, which will be seen to be a continuation of the curve A and joined thereto at the zero voltage and current point of the plot, illustrates the typical reverse current relationship with reverse voltage biasing of a semiconductor diode. This curve B is illustrative of a common soft diode wherein the device fails to prevent reverse biasing conduction to the extent desired. Inasmuch as diodes are commonly employed as switching devices and rectifiers, it is highly desirable that reverse biasing thereof will produce substantially no reverse current therethrough, at least within a substantial reverse voltage range. The so-called soft diode characteristics illustrated by curve B of FIG. 1 is commonly encountered in conventional diodes, wherein a measurable and often appreciable reverse current is found to flow with only limited reverse voltage applied to the device. It will be appreciated that in those applications wherein the unidirectional conduction characteristics of diodes are of importance, the minimization of reverse current flow is of major importance. The curve C, shown in FIG. 1 as a dashed line, approximates the desirable reverse biasing relationship of a diode semiconductor wherein only a very minute reverse current flows over a substantial range of reverse biasing of the device. The reverse voltage characteristic illustrated by the curve C of FIG. 1 is attainable by the present invention. In accordance herewith, the reverse current conduction of diode semiconductors may be minimized to the extent that substantially no measurable current flow occurs with reverse biasing of the diode up to a point of diode breakdown, whereat a very substantial and almost instantaneous current surge in the reverse direction to the diode occurs. While the curve B of FIG. 1 illustrating a conventional reverse voltage diode characteristic departs rather radically from that desired, it is by no means uncommon for commercially available diode semiconductors to have electrical characteristics as indicated by this curve. For a conventional diode semiconductor having a theoretical breakdown at about 40 volts of reverse biasing, it is commonplace for a reverse current of 20 milliamperes to flow at a reverse voltage of only 20 to 30 volts. Additionally, many soft diodes exhibit even poorer reverse voltage characteristics. Diode semiconductors produced in accordance with the present invention have been found to have a reverse current flow of only 1 millimicroampere under the same conditions as the above example, i.e., at about two-thirds of the theoretical reverse breakdown voltage.

Figure 4:
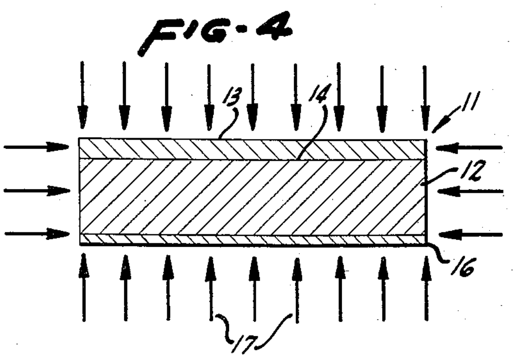
FIG. 4 is a schematic illustration of the process of this invention as applied to a diode semiconductor.

In accordance with the present invention a diode semiconductor, illustrated at 11 in FIG. 4 of the drawings, is manufactured in accordance with conventional procedures to include a wafer 12 having a layer of opposite type semiconducting material 13 disposed atop same. The diode 11 thus includes a lower layer or wafer 12 of one type of semiconducting material with a layer 13 of opposite type semiconducting material atop same and defining between such layers a transistor junction 14, all in conventional manner. A diode semiconductor as set forth above is operated upon in accordance herewith by the deposition upon the thicker of the two diode layers 12 of a layer of metal 16. This layer 16 is disposed upon the underside of the wafer 12 so as to be separated from the junction 14 by the substantial thickness of such layer 12. As to the application of this layer 16 to the undersurface of the wafer 12, such layer may be applied by plating methods or by evaporation and need only have a very minute thickness. For semiconducting devices adapted for high frequency work dimensions are materially minimized, and in connection with such a diode the upper semiconducting layer 13 may have a thickness of the order of two microns and the lower metal layer 16 a thickness of the order of one micron, with the overall diode thickness being of the order of 100 microns.

It is herein contemplated that the process shall provide for the diffusion of a selected metal into the wafer 12 of the diode 11 and such metal comprises the substance of the layer 16 deposited on the undersurface of the wafer 12. As regards the particular metal to be employed in this connection, it has been found that mid-band elements or deep level impurities, i.e., those introducing energy levels relatively equidistant between the conduction and valence bands of the semiconductor, shall be employed. The metals nickel, copper, silver, gold, manganese and iron are suitable deep level impurities for utilization in the process of the present invention. It is also required that the metal impurity have a high diffusion rate in the semiconductor material, however, this requirement is not particularly difficult to fulfill for deep level impurities normally readily diffuse in semiconductors. These deep level impurities may be distinguished from semiconductor dopants, in that these dopant impurities introduce energy levels in the forbidden band of the semiconductor adjacent either the valence or conducting bands thereof.

Diffusion of the layer of metal 16 upwardly into the wafer 12 of the diode is accomplished by the application of heat to the diode having the layer 16 deposited thereon. This is illustrated in FIG. 4 of the drawings by the arrows 17 representing the application of heat to the diode 11, and such heat is applied to raise the temperature of the diode to the eutectic temperature of the semiconducting material and the metal of the layer 16. It is only necessary in accordance with the process hereof for the layer 16 to diffuse a relatively few atoms of the metal thereof upwardly into the wafer 12 to accomplish the desired ends of the invention. It is in no way desired to diffuse a large amount of metal atoms upwardly through the diode wafer 12, for undue diffusion of metal elements into and through the diode may operate to electrically short the junction 14 therein. It is for this reason that the layer 16 is deposited upon the outer surface of the thicker of the two diode elements. With the above-noted minimal thickness of the upper layer 13, deposition of a metal layer on the outside thereof and diffusion of metal atoms therethrough way well deposit an undue amount of metal atoms at the juncture 14 so as to damage the juncture, however, this difficulty is not encountered when the metal is deposited upon the thicker layer 12.

As an example of the present invention, nickel is deposited upon the undersurface of a diode having a total thickness of about 100 microns and a thickness of the upper layer thereof of about two microns. This nickel layer is deposited to a thickness of about one micron. The diode is then heated to a temperature of about 1200 degrees centigrade and maintained at this temperature for approximately three minutes. The diode is then cooled and the lower portion of the wafer 12 is removed, in accordance with conventional practice, whereby the layer 16 of metal is likewise removed from the diode structure. A silicon diode semiocnductor produced in accordance with conventional manufacturing processing and including the process of the present invention as set forth above has the electrical characteristics illustrated by the two curves A and C of FIG. 1 of the drawings.

Figure 2:
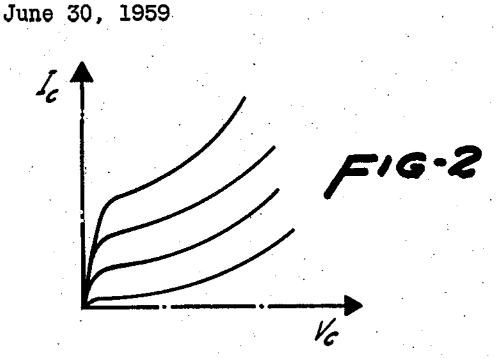
FIG. 2 is a plot of the collector current versus collector voltage for conventional transistor.

There is illustrated in FIG. 2 of the drawings a conventional family of curves relating the collector current to the collector voltage for a transistor having a grounded emitter connection and with the various curves of the illustrated family being illustrative of the collector current-voltage relationship for different values of base current of the transistor. It will be appreciated that the current-voltage relationships of FIG. 2 are in certain ways undesirable in that almost no linear portions of the relationship is to be found and, furthermore, because of the gradually varying relationship. These curves of FIG. 2 are representative of the current-voltage relationship of a conventional transistor. In accordance with this invention it is possible to materially improve this relationship to thereby produce electrical characteristics of the type illustrated in FIG. 3 of the drawing.

Figure 5A:
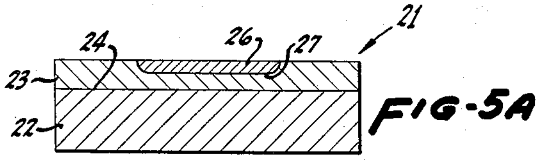
FIG. 5 shows at A, B, C, and D thereof a three-element transistor at various stages of manufacture in accordance with the process of this invention.

Considering the application of the process of this invention to a conventional transistor, reference is made to FIG. 5 of the drawings wherein there is shown at FIG. 5A a diffused transistor 21. This transistor 21, in accordance with conventional practice, includes a collector element 22 having a base element or layer 23 disposed atop same and diffused therein to form the transistor junction 24 therebetween. The transistor 21 further includes an emitter dot or element 26 difffused into the top of the base layer 23 and defining an emitter junction 27 therebetween. In the interest of simplicity the masking portions of the transistor which may be present at this stage of transistor manufacture are not shown in the portions of FIG. 5 hereof. During the manufacture of diffused transistors of the type herein illustrated, it is conventional to employ a relatively thick collector wafer or layer 22 which is later reduced in thickness to that desired for the resultant transistor structure. It is at this stage of manufacture that the transistor structure is illustrated at FIG. 5A. To this transistor 21 there is applied, as by plating or evaporation, a layer 28 upon the undersurface of the collector element 22. This layer 28 is formed of a metal chosen from the group of nickel, copper, gold, silver, manganese, and iron. These metals have the desired energy bands and are likewise readily diffused into the semiconducting material of the transistor. It is, of course, possible to employ the above-noted metals in the form of compounds such as, for example, nickel carbonate, however, it is necessary to exclude from such compounds any materials which may operate deleteriously upon the semiconducting material of the transistor. Followering the application of the layer of metal 28 to the undersurface of the collector element 22, the metal is diffused upwardly into the transistor by the application of heat thereto. This heat, as illustrated by the arrows 29 of FIG. 5C, is applied to raise the temperature of the transistor to the eutectic temperature of the metal-semiconducting material. Thus, for a double-diffused silicon transistor with a nickel layer applied to the undersurface of the collector thereof, it is suitable to raise the temperature to 1200 degrees centigrade and to maintain same for a duration of about three minutes. As illustrated in FIG. 5C, heat, as illustrated by the arrows 29, is applied to the transistor with the layer 28 thereon to accomplish the desired diffusion of the metal from such layer into the semiconducting material. Heating may be suitably accomplished by a variety of conventional means, such as furnaces normally employed in the manufacturing of transistors. Raising of the temperature of the transistor to the lowest possible fusible temperature between the metal of the added layer and the semiconductor material causes a substantial diffusion of metal atoms upward into the semiconducting material to thereby pronouncedly influence the electrical characteristics thereof. It is of course not necessary that the transistor be oriented in the manner illustrated in FIG. 5, for suitable diffusion of metal atoms into the semiconducting material is equally well attained if the transistor is relatively inverted from the position illustrated. Again, as in the case of the diode described above, it is necessary that a sufficient thickness of semiconducting material be present between the layer of metal and the transistor junction in order that an undue concentration of metal atoms at such junction shall not deleteriously affect the characteristics thereof. As above noted, a substantial collector thickness is normally maintained throughout a major portion of the manufacturing cycle of the transistor so that application of the layer 28 to the undersurface of the collector 22 readily fits into the normal manufacturing cycle and yet is highly advantageous in carrying out the process hereof.

Figure 3:
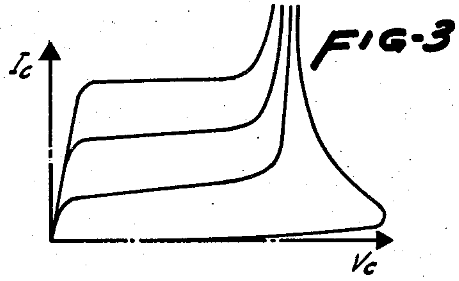
FIG. 3 is a plot of the collector current versus collector voltage for a transistor manufactured in accordance with the process of this invention.
Figure 5D:
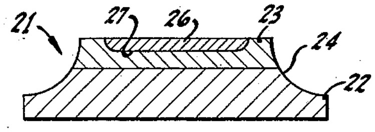
Figure 5B:
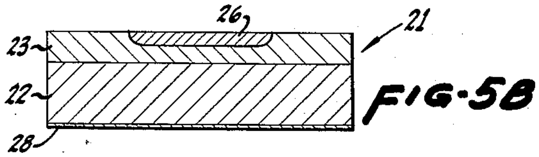
Figure 5C:
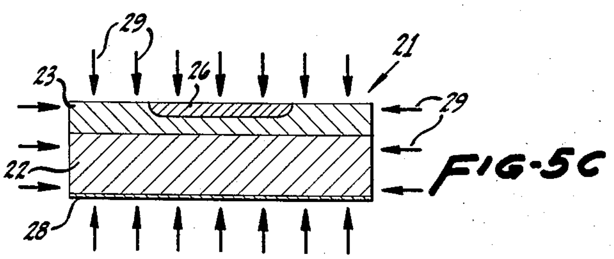

Following diffusion of atoms of a particular chosen metal into the material of the transistor, the normal manufacturing cycle is continued in a conventional manner. Thus, the lower portion of the collector layer 22 is removed, as is conventional, to thereby also remove the layer 28 which has been deposited thereon in accordance with this invention. Likewise, a suitable mesa may be formed on the transistor, as by etching away the laterally extending portions of the upper surface of the transistor to thereby expose the collector junction 24 at a point quite closely spaced from the emitter junction 27. This final transistor structure is illustrated at FIG. 5D of the drawing, and is in itself quite conventional, however, the presence of a minute amount of metal diffused therein by means of the present invention serves to materially affect and improve the electrical characteristics of the resultant transistor. As shown in FIG. 3, the collector current for zero base current is substantially zero over a wide range of collector voltage. Furthermore, the collector current-voltage characteristics at zero base current and with common emitter connection, exhibit a negative resistance which is highly sought after in the transistor art. At a particular and predictable value of the collector voltage the collector current rapidly increases for decreasing values of collector voltage. The collector current-voltage relationship for other values of base current likewise exhibit sharply varying relationships. Contrasted to the family of curves illustrated in FIG. 2 for a conventional transistor, the characteristics shown in FIG. 3 are materially improved thereover. By a very simple and inexpensive addition to the manufacturing process of transistors and diode semiconductors it is herein possible to produce a substantial and highly desirable variation in the resultant electrical characteristics of the semiconducting devices so processed. Furthermore, the process hereof is particularly well adapted to inclusion in conventional transistor manufacturing methods. It is possible to diffuse the metal impurities into the transistor at the same time as the emitter is diffused herein. A relatively wide latitude of temperatures and times is available for the process hereof as the eutectic temperature of gold-silicon is about 378 degrees centigrade, nickel-silicon about 870, and silver-silicon about 830. The diffusion rate of the metal impurities in the semiconductor increases exponentially with temperature so that the layer 28 may, for example, be added to a wafer from which a large number of transistors are being formed at an intermediate point in the emitter diffusion step and the step then continued to also diffuse the selected metal impurity of such layer into the transistor. Only conventional equipment is required to carry out the present process and, furthermore, such equipment is normally employed in the manufacturing cycle of transistors and semiconducting devices in general. The relatively short time required to carry out the process hereof and the relatively low temperatures necessary to the complete accomplishment of this process serve to highly commend same to the inclusion thereof in transistor and semiconductor device manufacturing cycles.

What is claimed is:

1. In a process of transistor manufacture wherein successive rectifying junctions are formed by diffusion of dopants into one side of a wafer of semiconducting material and there is subsequently removed a portion of the other side of the wafer to establish a small collector thickness, the improvement comprising coating the other side of the wafer with a metal chosen from the grouping consisting of iron, nickle, copper, gold and silver at a stage of manufacture prior to removal of said portion of the wafer and following formation of a least one junction of the transistor, heating the coated wafer to at least the eutectic temperature of the coating material and said semiconducting material for a period of a few minutes for diffusing said metal throughout the transistor in a quantity less than that required to change the conductivity type of any portion of the transistor, and removing said coating by said subsequent manufacturing step of reducing the wafer thickness, whereby the resultant transistor has sharply varying current-voltage characteristics.

2. In a process of transistor manufacture wherein different types of semiconducting material are layered together to form transistor junctions therebetween, the added steps comprising coating a surface of the thickest layer of semiconducting material with a metal chosen from the group of copper, iron, silver, gold and nickel, said coating being separated from all transistor junctions by the maximum thickness of semiconductor material in the device, applying heat to the device to raise the temperature thereof to substantially the eutectic temperature of the semiconducting material and coated metal, limiting the duration of application of heat to a few minutes, and removing at least said coated metal to produce a sharply varying relationhip between collector current and the voltage.

3. A process of transistor manufacture comprising double-diffusing silicon semiconducting material with selected impurities therein to form a three-element transistor having a collector element disposed on one side thereof, coating the exposed side of said collector with a thin layer of a metal having a fast diffusion rate and establishing a midband energy level in the semiconducting material, raising the temperature of said collector and coating to at least the lowest temperature of fusion therebetween whereby the metal diffuses into the collector, and removing from the transistor a portion of the collector including the coating thereon.

4. A process as set forth in claim 3 further characterized by said semiconductor material being silicon with selected impurities therein, said coating metal being nickel, and said temperature being raised to 1200 degrees centigrade for a period of substantially three minutes.

5. A process as set for the claim 3 further characterized by said coating metal being chosen from the group of silver, gold, copper, nickel, and iron.

6. A process of transistor manufacture wherein a transistor is fabricated with a substantial thickness of semiconducting material between an exposed outer surface thereof and the nearest transistor junction thereto, and comprising the steps of evaporating a very thin coating of metal upon said exposed outer transistor surface, said metal having a fast diffusion rate in the semiconducting material and establishing energy levels substantially midway between the valence and conducting bands of the semiconducting material, raising the temperature of the transistor and coating thereon to substantially the fusible temperature thereof and maintaining such temperature for a short time, and removing the coating from the transistor whereby the resultant transistor so processed has a very sharply varying collector relationship.

7. A process as set forth in claim 6 further characterized by said metal being gold.

8. An improvement in the process of manufacturing double-diffused silico transistors wherein selected dopants are separately diffused into a silicon wafer to form transistor junctions therein and comprising the steps of plating a very thin layer of metal upon the other side of said wafer from the side on which dopants are diffused and following the establishment of at least one transistor junction in the wafer, said metal being chosen from the group comprising iron, nickel, copper, gold, and silver, heating the wafer concurrently with the diffusion of another dopant therein to a temperature in excess of the eutectic temperature of said metal and silicon for a short period to diffuse a small amount of the material through the wafer, and removing a part of said wafer including the metal layer.

References Cited in the file of this patent

UNITED STATES PATENTS

| | | |
|---|---|---|
| 2,701,326 | Pfann | Feb. 11, 1955 |
| 2,770,761 | Pfann | Nov. 13, 1956 |
| 2,774,695 | Burton | Dec. 18, 1956 |
| 2,827,436 | Bemski | Mar. 18, 1958 |
| 2,829,075 | Pankove | Apr. 1, 1958 |
| 2,849,664 | Beale | Aug. 26, 1958 |
| 2,854,363 | Seiler | Sept. 30, 1958 |
| 2,860,219 | Taft | Nov. 11, 1958 |
| 3,013,955 | Roberts | Dec. 19, 1961 |

FOREIGN PATENTS

| | | |
|---|---|---|
| 331,017 | Switzerland | Aug. 15, 1958 |

OTHER REFERENCES

Constitution of Binary Alloys, by Hansen, 2nd edition, 1958, McGraw-Hill Book Co., Inc., page 769 and 1040 relied upon.